US006593570B2

(12) United States Patent
Li et al.

(10) Patent No.: US 6,593,570 B2
(45) Date of Patent: Jul. 15, 2003

(54) ION OPTIC COMPONENTS FOR MASS SPECTROMETERS

(75) Inventors: Gangqiang Li, Palo Alto, CA (US); Charles W. Russ, IV, Sunnyvale, CA (US)

(73) Assignee: Agilent Technologies, Inc., Palo Alto, CA (US)

(*) Notice: Subject to any disclaimer, the term of this patent is extended or adjusted under 35 U.S.C. 154(b) by 159 days.

(21) Appl. No.: 09/747,242

(22) Filed: Dec. 22, 2000

(65) Prior Publication Data

US 2001/0035498 A1 Nov. 1, 2001

Related U.S. Application Data

(60) Provisional application No. 60/206,673, filed on May 24, 2000.

(51) Int. Cl.[7] .......................... H01J 49/00; B01D 59/44

(52) U.S. Cl. ....................... 250/290; 250/281; 250/282; 250/288

(58) Field of Search ........................... 205/742; 922/23; 310/11; 250/394, 281–290, 293–297, 396 R, 397, 400; 330/4.7; 376/137; 315/3, 5.19, 39; 343/791; 342/368; 333/239

(56) References Cited

U.S. PATENT DOCUMENTS 2,648,000 A * 8/1953 White ........................ 343/791
2,667,597 A * 1/1954 Bailey ........................... 315/3
3,029,199 A * 4/1962 Baker ......................... 376/137

(List continued on next page.)

FOREIGN PATENT DOCUMENTS

JP 04119001 A * 4/1992 ............. H01P/5/18

OTHER PUBLICATIONS

H. Wollnik, "Optics of Charged Particles", Academic Press, (1987); 287–290.

Franzen, "Electrical Ion Guides", Proc. of the 44th MSMA Conference on Mass Spectrometry and Allied Topics; (1996); 1170.

S Guan and A G. Marshall, J. Am. Soc. Mass Spectrometry, 7:101–106 (1996); "Stacked–Ring Electrostatic Ion Guide".

S.A. Shaffer, et al., Rapid Comm. Mass Spectrometry, 11:1813–1817 (1997); "A Novel Ion Funnel for Focusing at Elevated Pressure Using Electrospray Ionization Mass Spectrometry".

*Primary Examiner*—John R. Lee
*Assistant Examiner*—Bernard E. Souw

(57) ABSTRACT

Apparatus and methods are disclosed for manipulating charged particles. The charged particles are directed from a source thereof into a zone. A first electrical potential is generated in the zone. Simultaneously, a second electrical potential is generated outside the zone. The second electrical potential penetrates into the zone and combines with the first electrical potential to form an oscillating electric potential field having predetermined characteristics sufficient to manipulate the charged particles. The manipulating of the charged particles includes, e.g., transporting, collisional cooling, collisional induced dissociating and collisional focusing. In one embodiment an apparatus comprises a hollow first element and a hollow second element. The second element is disposed within the first element. The second element has at least two openings in a wall thereof. The openings are elongated and radially disposed with respect to the axis of the second element. The length of the openings is at least about 20% of the length of the second element The first element and the second element each are adapted independently to receive a voltage to generate within the second element an electric potential having predetermined characteristics. The apparatus and methods of the invention have particular application to the field of mass spectrometry.

41 Claims, 8 Drawing Sheets

U.S. PATENT DOCUMENTS

| | | | | | |
|---|---|---|---|---|---|
| 3,188,588 | A | * | 6/1965 | Keen | 333/256 |
| 3,227,959 | A | * | 1/1966 | Kluever | 330/4.7 |
| 3,410,997 | A | * | 11/1968 | Brubaker | 250/290 |
| 3,452,225 | A | * | 6/1969 | Gourdine | 310/11 |
| 3,602,837 | A | * | 8/1971 | Goldsborough | 372/70 |
| 4,328,420 | A | | 5/1982 | French | 250/282 |
| 4,801,903 | A | * | 1/1989 | Mohr | 333/113 |
| 5,095,208 | A | | 3/1992 | Ose et al. | 250/329 |
| 5,157,260 | A | | 10/1992 | Mylchreest et al. | 250/423 |
| 5,206,506 | A | * | 4/1993 | Kirchner | 250/281 |
| 5,852,294 | A | | 12/1998 | Gulcicek et al. | 250/292 |
| 5,962,851 | A | * | 10/1999 | Whitehouse et al. | 250/288 |
| 6,011,259 | A | | 1/2000 | Whitehouse et al. | 250/287 |
| 2002/0014587 | A1 | * | 2/2002 | Benveniste et al. | 250/290 |

* cited by examiner

ION OPTIC COMPONENTS FOR MASS SPECTROMETERS

This application claims benefit of Provisional No. 60/206,673 filed May. 24, 2000.

BACKGROUND OF THE INVENTION

This invention relates to mass spectroscopy and in particular to components for manipulation of charged particles in, for example, mass spectrometers.

Mass spectrometry is an analytical methodology used for quantitative chemical analysis of materials and mixtures of materials. In mass spectrometry, a sample of a material, usually an organic or inorganic or biomolecular sample, to be analyzed called an analyte is broken into electrically charged particles of its constituent parts in an ion source. The particles are typically molecular in size. Once produced, the analyte particles are separated by the spectrometer based on their respective mass-to-charge ratios. The separated particles are then detected and a mass spectrum of the material is produced. The mass spectrum is analogous to a fingerprint of the sample material being analyzed. The mass spectrum provides information about the masses and, in some cases, quantities of the various analyte ions that make up the sample. In particular, mass spectrometry can be used to determine the molecular weights of molecules and molecular fragments within an analyte. Additionally, to some extent mass spectrometry can identify molecular structure and sub-structure and components that form the structure within the analyte based on the fragmentation pattern when the material is broken into particles. Mass spectrometry has proven to be a very powerful analytical tool in material science, chemistry and biology along with a number of other related fields.

There are challenges in building a high performance mass spectrometer such as a mass spectrometer having high sensitivity, high resolution, high mass accuracy, and wide dynamic range. One challenge is how to efficiently use sample material, which includes maximizing ionization efficiency and then efficiently transmitting formed ions into a mass analyzer.

However, for many mass spectrometric applications, high loss occurs when transmitting ions from a high-pressure region where ions are usually generated, to a low pressure region in the mass analyzer. This ion loss is a result of relatively long distances needed for differential pumping stages and ion-molecule collision with a background gas when ions travel this distance. This is especially found in situations where ions are generated at atmospheric pressure or relatively high gas pressure. Such applications include, for example, electrospray ionization mass spectrometer (ESI-MS), atmospheric pressure chemical ionization mass spectrometer (APCI-MS), inductively coupled plasma mass spectrometry (ICP-MS) and glow discharge mass spectrometry (GDMS).

Ion optic devices have been used for transmitting charged particles and manipulating a beam of charged particles. In particular, ion optic devices have been used, for example, for focusing or defocusing of a beam of charged particles and for changing the particle energy and the energy distribution of the beam. Prior approaches to the above devices generally can be divided into two categories. Some known devices use magnetic fields or electrostatic fields in various configurations. Such devices include, for example, electrostatic einzel lenses and electrostatic or magnetic sector fields and multipole lenses. Other known devices use a radio frequency (RF) electrical field such as that employed in RF multipole ion guides and RF ion funnels, which consist of a series of ring electrodes. In comparison to those approaches that employ an electrostatic field, ion optic devices using an RF field offer significantly higher transmission efficiency and the ability to modify ion energy by collisional cooling when utilized with a gas of intermediate pressure. Another advantage is the use of the RF field for collision induced dissociation (CID) to produce fragment species from molecular ions, which is an important tool for study of molecular structure. In commercial mass spectrometric instruments, RF multipole ion guides are widely used.

In collision induced dissociation, a multipole ion guide also acts as a collision cell. When molecular or polyatomic ions collide with the background gas (normally an inert gas), a portion of the translation energy of the ions converts into activation energy that is sufficiently high enough and certain molecular bonds are broken. The fragment pattern produced characterizes the original molecule and provides information about its structure. In such applications, a multipole ion guide is placed between two mass spectrometers to form a tandem MS and is used to confine both the parent ions and the fragments of the parent ions otherwise referred to as daughter ions. Confinement of the ions is generally realized by use of an oscillating electrical potential field.

A conventional electric RF multipole ion guide may be constructed by using several (even numbers) circular electrically conductive rods of identical geometric dimension arranged parallel at a circumference of radius $r_0$, as shown in FIG. 1. When radio frequency voltages of opposite polarities, $U+V\cos(\omega t)$ and $-[U+V\cos(\omega t)]$ are alternately applied to the adjacent rods, a symmetric RF field is established inside of radius $r_0$ as can be derived from the electric potential field shown in FIG. 2. In accordance with the numbers of rods, such fields are classified as quadrupole, hexapole and octopole, and so forth, for four rods, six rods and eight rods, respectively. At any cross section of the RF multipole field, the potential distribution is a function of time and is characterized by the RF frequency $\omega$.

SUMMARY OF THE INVENTION

One embodiment of the present invention is an apparatus comprising a hollow first element and a hollow second element. The second element is disposed within the first element. The second element has at least two openings in a wall thereof. The openings are elongated and radially disposed with respect to the axis of the second element. The length of the openings is at least about 20% of the length of the second element. The first element and the second element each are adapted independently to receive a voltage to generate within the second element an oscillating electric potential field having predetermined characteristics.

Another embodiment of the present invention is an apparatus comprising a tubular first element and a tubular second element. The second element is coaxially disposed within the first element. The second element has from two to eight openings in a wall thereof. The openings are elongated and radially disposed with respect to the axis of the second element. The length of the openings is at least about 20% of the length of the second element. The dimensions of the openings are approximately equal. The first element and the second element each are adapted independently to receive a voltage to generate within the second element an oscillating electric potential field having predetermined characteristics.

Another embodiment of the present invention is an apparatus comprising a tubular first element and a tubular second element. The second element is coaxially disposed within said first element and has from two to eight openings in a wall thereof. The openings are elongated and radially disposed with respect to the axis of the second element and the length of each of the openings is at least about 20% of the length of the second element. The dimensions of the openings are approximately equal. The ends of the first element and the second element are not coplanar. The first element and the second element are each adapted independently to receive a voltage to generate within the second element an oscillating electric potential field having predetermined characteristics.

Another embodiment of the present invention is a mass spectrometry apparatus comprising an ion source for producing ions, an apparatus for manipulating the ions, an electrical source for independently applying voltages to elements of the apparatus and a mass analyzer. The apparatus for manipulating ions generally is placed between the ion source and the mass analyzer. The apparatus for manipulating the ions comprises a tubular first element and a tubular second element. The second element is coaxially disposed within the first element. The second element has two to eight openings in a wall thereof wherein the openings are elongated and radially disposed with respect to the axis of the second element. The length of each of the openings is at least about 20% of the length of the second element. The first element and the second element each are adapted independently to receive a voltage to generate within the second element an oscillating electric potential field having predetermined characteristics.

Another embodiment of the present invention is a method for manipulating charged particles. Charged particles are directed from a source thereof into a zone. A first electrical potential is generated in the zone. Simultaneously, a second electrical potential is generated outside the zone. The second electrical potential penetrates into the zone and combines with the first electrical potential to form an oscillating electrical potential field having sub-fields of alternating polarity that causes the charged particles to execute harmonic motion.

Another embodiment of the present invention is a method for creating an oscillating electrical potential field having sub-fields of alternating polarity. A first electrical potential is generated in a zone. Simultaneously, a second electrical potential is generated outside the zone. The second electrical potential penetrates into the zone and combines with the first electrical potential to form an oscillating electrical potential field having sub-fields of alternating polarity.

Another embodiment of the present invention is a method for creating an oscillating electric potential field having sub-fields of alternating polarity. A first voltage is applied to a second element of an apparatus comprising a first element and the second element. The second element is coaxially disposed within the first element and the second element has at least two openings in a wall thereof. The openings are elongated and radially disposed with respect to the axis of the second element. The length of the openings is at least about 20% of the length of the second element and the dimensions of the openings are approximately equal. A second voltage is applied to the first element to generate within the second element an oscillating electric potential field having sub-fields of alternating polarity. At least one of the voltages has an oscillating voltage component.

Another embodiment of the present invention is a method for transporting charged particles. Charged particles are directed from a source thereof into a tubular second element of an apparatus comprising a tubular first element and the tubular second element. The second element is coaxially disposed within the first element and has at least two openings in a wall thereof. The openings are elongated and radially disposed with respect to the axis of the second element. The length of the openings is at least about 20% of the length of the second element. The dimensions of the openings are approximately equal. Voltages are independently applied to the first element and the second element to generate an oscillating electric potential field having predetermined characteristics sufficient to confine the charged particles in the second element during transportation through the second element.

Another embodiment of the present invention is an apparatus such as mentioned above employed in systems in which charged particles are transferred through one or more vacuum stages or chambers while allowing neutral background gas to be pumped away. In that regard the present apparatus may be disposed between two or more vacuum chambers.

Another embodiment of the present invention is a method for cooling charged particles. In the method the charged particles are directed from a source thereof into a tubular second element of an apparatus, which comprises a tubular first element and the tubular second element. The apparatus is held under a neutral gas background usually at an intermediate pressure. The second element is coaxially disposed within the first element The second element has at least two openings in a wall thereof wherein the openings are elongated and radially disposed with respect to the axis of the second element. The length of each of the openings is at least about 20% of the length of the second element. The pressure of the neutral gas is sufficient such that the mean free path of the neutral gas is smaller than the length of the second element. Voltages are applied independently to the first element and the second element to generate an oscillating electric potential field having predetermined characteristics sufficient to bring into harmonic motion the charged particles passing through the second element.

Another embodiment of the present invention is a method for subjecting charged particles to collision induced dissociation. The charged particles from a source thereof, are directed into a tubular second element of an apparatus comprising a tubular first element and the tubular second element, which is coaxially disposed within the first element. The apparatus is held under a neutral gas background usually at an intermediate pressure. The second element has at least two openings in a wall thereof wherein the openings are elongated and radially disposed with respect to the axis of the second element. The length of each of the openings is at least about 20% of the length of the second element. The pressure of the neutral gas is sufficient such that the mean free path of the ions is smaller than the length of the second element. Voltages are applied independently to the first element and the second element to generate an oscillating electric potential field having predetermined characteristics sufficient to confine the charged particles passing through the second element so that the particles undergo collision induced dissociation.

DETAILED DESCRIPTION OF THE INVENTION

Figure 1:
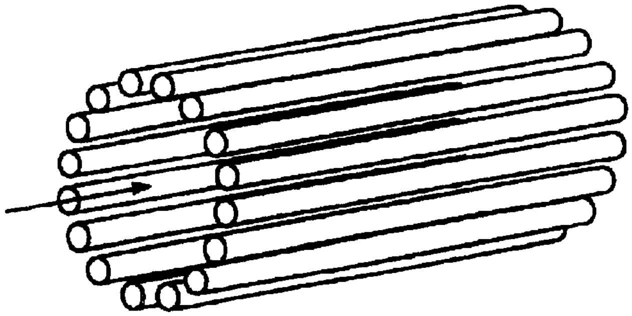
FIG. 1 (PRIOR ART)
FIG. 1 is a diagrammatic sketch showing a multipole ion guide of the prior art consisting of 16 circular rods.
Figure 2:
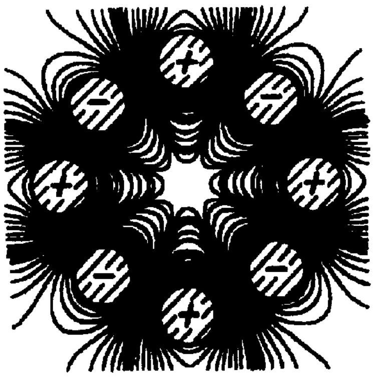
FIG. 2 (PRIOR ART)
FIG. 2 is a depiction of a computer simulation of an electric potential field produced by an octopole ion guide of the prior art.

The present invention provides ion optic components and methods of their use to generate electrical fields having predetermined characteristics for carrying out operations for manipulating charged particles. The term "charged particles" means particles that exhibit an overall charge greater or less than neutral. Such charged particles include, for example, positively and negatively charged particles, electrons, protons, positrons, singularly and multiply charged particles, atomic and molecular ions and the like. In a particular embodiment the charged particles are ions formed for analysis by mass spectrometry, and the like.

Operations for manipulating charged particles such as ions include for example, transportation of ions, collisional cooling of ions, collisional fragmentation of ions, collisional focusing of ion beams, and so forth. The above operations may be achieved in accordance with the present invention without using the multipole ion guide structures or multiple lens systems of the prior art. Furthermore, the present invention allows the generation of oscillating electric potential fields having predetermined characteristics, which can be tailored to the needs of the artisan by controlling the dimensions of apparatus in accordance with the present invention as well as voltages applied to the elements of the present apparatus. In contrast to multipole ion guides, the present invention allows separation of RF and DC functions onto different elements. An oscillating electric potential field includes any field that exhibits periodicity such as, for example, sine, cosine, square, saw-tooth, and the like.

Apparatus of the present invention are particularly useful in applications where ions are formed at higher pressures and must be transmitted through regions of decreasing pressure. The components of the present apparatus can be made with a number of structural variations and can be used in different combinations and operation modes for a wide range of applications.

In a basic embodiment of the present invention, two hollow elements are disposed one within the other. The elements are electrically isolated. The inner element comprises at least two openings that are elongated and radially disposed with respect to the longitudinal axis of the inner element and are substantially evenly distributed around the element. The length of each of the openings is at least about 20% of the length of the second element or a segment thereof as discussed hereinbelow.

The elements are adapted for independent application of electrical voltages to the elements. Oscillating electric potential fields having predetermined characteristics can be generated inside the inner element. The predetermined characteristics are related to the magnitudes of the voltages applied to the elements, the shapes and dimensions of the first element and the second element, the alignment of the second element with respect to the first element and the number and dimensions of the openings.

The terms "applying voltages," "voltages applied" and "application of electrical voltages" and the like refer to the directing of electrical potential to each of the elements, or one or more segments or sections thereof, to produce a difference in electrical potential therebetween. The terms include the maintaining of one of the elements at ground and direction of electrical potential to the other element to produce a difference in electrical potential.

The terms "electric potential" and "electric field" are used herein with their conventional meanings. As is known in the art, a force is exerted on an ion by an electric field and that force is equal to the electric field at the position of the ion multiplied by the electric charge on the ion. At any point the electric field, a vector function of position, can be derived from the potential, a scalar function of position, at that point; the field is the negative gradient of the potential. A third term, "electric potential field," is also used herein and refers to an electric potential in a region of space that is a function of position in the region. Electric potential fields are illustrated herein by equipotential lines in the manner conventional in the art. Yet another term, namely, "sub-field," is used herein to describe a region within an electric potential field. A sub-field exhibits a pattern of equipotential lines that is similar to those in other sub-fields of the electric potential field.

The hollow elements are typically integral elements, i.e., each of the elements, or segments thereof, is of unitary construction or constructed in one piece. The elements are constructed from materials that are electrically conductive such as, for example, metals and alloys thereof, e.g., stainless steel, aluminum, tantalum, tungsten, tantalum-aluminum, and the like; metallized components, e.g., glass, ceramic, plastic and so forth coated with a metal or metal alloy such as gold and the like. The elements may be manufactured by techniques known in the art. Such techniques include, by way of illustration and not limitation, machining, extrusion, rolling, lithographic etching and so forth.

The inner element is positioned within the outer element. A basic consideration for positioning the elements with respect to one another is that the inner element and the outer element be electrically isolated. The elements in the present apparatus are electrically isolated to permit independent application of voltages to the elements. The elements may be positioned relative to one another and also electrically isolated using non-conductive materials. Accordingly, the elements may be positioned and electrically isolated by means such as spacing rods, strips, posts and the like, O-rings, and so forth, made of ceramic, glass, polyimide, Teflon®, rubber, and the like.

The dimensions of the elements are directly related to, and generally governed by, the particular use of the apparatus. In theory the length of the elements has no limit as long as the charged particles traveling through the inrer element do not collide with the walls of the inner element. Usually, the elements are of approximately equal length. The ends of the inner and the outer elements may be coplanar or non-coplanar. When non-coplanar, the outer element has at least one portion, usually one end thereof, that extends beyond one end of the inner element. The extension is dependent on the diameter of the inner and the outer elements. Typically, the outer element extends beyond the inner element by a distance equal to about 5 to about 50%, usually, about 10 to about 25%, of the cross-sectional dimension of the inner element. Furthermore, when non-coplanar, the inner element may have a portion, usually one end thereof, that extends beyond one end of the outer element by a distance of about 5 to about 50%, usually, about 10 to about 25% of the cross-sectional dimension of the inner element. The extension allows the production of oscillating fields such as RF fields that provide more efficient focusing of an ion beam entering or exiting the device. Furthermore, the extension assists in trimming fringe fields and facilitates the movement of the field generated by the outer element through the openings in the walls of the inner element. Longer lengths for the inner and the outer element are generally employed for applications involving high-energy particles such as in a linear accelerator. For typical uses in the manipulation of charged particles, particularly in the areas of mass spectrometry as discussed above, the elements have a length of about 10 to about 500 millimeters, more usually, about 25 to about 200 millimeters.

The shapes of the inner and outer elements are generally the same but need not be. Furthermore, the shapes of segments that form an element may be the same or different. The shape of each of the hollow elements, or segments thereof, may be, for example, circular, square, rectangular, elliptical, triangular, pentagonal, hexagonal and the like when viewed in the cross-section. Preferably, the hollow elements are tubular, more preferably, cylindrical. The elements may be straight or curved. For curved elements the angle of curvature is about 1 to about 90 degrees from an axis projected from the plane at one end of the element. The shape of the elements is usually a matter of design and mechanical considerations.

As mentioned above, the inner element is disposed within the outer element. Preferably, the inner element and the outer element are coaxially aligned. If the inner element and the outer element are not coaxially aligned, they are substantially coaxially aligned such that the alignment varies from coaxial by no more than about 5%, usually, by no more than about 1%.

The inner dimensions of the outer element are sufficient to permit the inner element to be disposed therein. As mentioned above, the dimensions of the elements are directly related to, and generally governed by, the particular use of the apparatus. Accordingly, the cross-sectional dimension of the inner element may be as small as about one or a few millimeters and as large as about ten centimeters. The cross-sectional dimension is measured from farthest opposing points on a cross-section of the inner wall(s) of an element, e.g., the inner element. For example, for an element that has a circular cross-section, the dimension is the diameter of the circle. In another example, the inner element has a square cross-section and the dimension is measured from opposing corners of the square. As is evident from the above, the outer dimensions of the inner element are sufficient to permit the inner element to be disposed within the outer element. The outer element accordingly has an inner cross-sectional dimension that accommodates the inner element. Larger dimensions may be used in the elements of the apparatus for applications involving high-energy particles such as in a linear accelerator. For use in mass spectrometry the elements typically have dimensions that are within the smaller values in the above ranges. Thus, for use in mass spectrometry, the inner element usually has an inner cross-sectional dimension of about 1 millimeter to about 30 millimeters, usually, about 2 millimeters to about 10 millimeters.

The dimensions of one or both of the hollow elements may vary over the cross-section of the elements from one point to another. For example, the cross-sectional dimension adjacent one end of one or both of the elements may be less than that adjacent the other end of such element or elements. This configuration results in a tapered apparatus with either one or both of the elements being tapered. On the other hand, for example, the cross-sectional dimensions at the ends of the element may be larger or smaller than the cross-sectional dimensions at the middle of the element. In general, the inner cross-sectional dimensions of the same element vary no more than about 80%, usually, no more than about 40% from one point to another along the length of the element.

The thicknesses of the walls of the hollow elements are independent of one another and are dependent on the particular use of the apparatus. In general, the thickness of the walls of the outer element is not critical. A primary consideration is the structural or mechanical integrity or stability of the outer element. However, in general, the thickness of the outer element has little if any effect on the nature of an oscillating electric potential field inside the inner element. The walls of the inner element should have a thickness that permits penetration, to within the inner element, of the field generated by the outer element. Thus, the walls of the inner element should be thin enough to permit such penetration but thick enough to provide structural stability. The thickness of the walls of the inner element is also dependent on the length of the inner element. Accordingly, by way of illustration and not limitation, a tubular inner element that is about 8 to about 10 centimeters in length is generally about 0.4 to about 0.6, usually, about 0.5 centimeters thick. The dimensions of the walls of other inner elements may be determined with reference to the above example.

The distance between the outer wall of the inner element and the inner wall of the outer element (otherwise referred to as a "gap") is sufficient so that the electrical potential generated from the outer element penetrates into the electrical potential generated by the inner element. The size of the gap is also dependent on the intensity of the applied electrical voltages. In general, the greater the gap, the higher the voltage that must be applied to the outer element. In addition, too narrow a gap may result in a voltage breakdown, especially in high pressure situations. Furthermore, too narrow a gap may lead to high capacitance with a resulting requirement of high RF drive power. One skilled in the art may readily determine the gap experimentally with the above considerations in mind.

The openings in the apparatus of the present invention provide for a potential field that is essentially constant in form along the central axis, although varying in magnitude with time when oscillatory voltages are applied to the elements. This is to be distinguished from the apparatus and methods of Ose, et al. (U.S. Pat. No. 5,095,208) where the potential fields vary in space, not time, and have polarities that alternate with distance along the axis of the apparatus. Ose, et al., provides for constant (in time) axial fields, which is an embodiment similar in function to ring stack devices known in the art. The fields of constant form produced in the apparatus of the present invention allow the realization of the advantages discussed herein. The nature of the fields produced in the present invention are discussed more fully hereinbelow.

The openings are in the walls of the inner element of the present apparatus. In general, there are at least two openings in the inner element per element or segment thereof as explained more fully below. The number and width of openings are chosen based on the predetermined characteristics desired for the oscillating electric potential field. The number of openings is a factor in determining the nature of the oscillating electric potential field created within the inner element. The openings in the inner element allow the electrical potential resulting from the application of electrical voltages to the outer element to penetrate into the area inside the inner element. The wall of the inner element usually has at least two openings per segment of the inner element and the maximum number of openings in the inner element per segment is about 16. Usually, the number of openings per segment is about 3 to about 8, more usually, about 3 to about 6.

It is also within the purview of the present invention to produce oscillating electric potential fields of different predetermined characteristics in different portions of an inner element. To this end and as mentioned above, the inner element or the outer element may be segmented, i.e., may be constructed from separate pieces. The number of segments is a matter of design choice depending on the desired characteristics for the oscillating electric potential field. Usually, the number of segments in the inner element or the outer element is determined by the length of the element divided by the length of the segments. The length of each segment is usually at least equal to or more usually greater than the inner diameter of the segment. Preferably, the length of each segment is about 1.0 to about 3 times greater than the inner diameter of the segment, more preferably, about 2 times greater.

Each segment of a segmented element may be adapted to independently receive a voltage from a voltage source. The segments of an element are positioned with respect to each other and to another element by means such as discussed above. In addition, the segments of an inner or an outer element may be positioned with respect to one another by interconnecting non-conducting positioning means such as that for the positioning means and electrical isolation means described above for the inner and outer elements. For example, the means comprises strips, rods, O-rings and the like made from non-conducting material such as glass, ceramic, polyimide, rubber, Teflon, plastic, and the like.

The openings are usually substantially evenly distributed around the wall(s) of the inner element or each segment of the inner element. If not evenly distributed, the openings may be separated by spaces that vary from equal distribution by no more than about 10%, usually, no more than about 2%. As is evident from the above discussion, the placement of the openings in the wall(s) of the inner element has a direct relationship to the shape of the oscillating electric potential field produced within the inner element. When the openings in a segment are equally spaced and of equal width, the oscillating electric potential field produced is symmetrical whereas an asymmetric oscillating electric potential field is produced when the openings are not equally distributed, when they are of unequal width, or when they have both inequalities. Accordingly, the level of asymmetry of the oscillating electric potential field can be controlled by the placement of the openings in the wall(s) of each segment of the inner element.

It should be noted that the openings in each segment of a segmented device in accordance with the present invention are positioned such that a substantially continuous field that is substantially constant in form along the axis of the apparatus is produced as discussed above for an apparatus that is not segmented. Accordingly, there is substantially no displacement of the openings from one segment to the next in the present apparatus. By substantially no displacement is meant that the longitudinal axis of an opening in one segment is not displaced from the longitudinal axis of a corresponding opening in an adjacent segment such that the field produced is no longer a continuous field. In other words the displacement must not be great enough to yield a field that is a function of space and not constant in form along substantially the entire axis of the apparatus or a segment thereof. In the present invention axial fields are minimized except to the extent that a DC axial component is present in addition to a radial component in order to achieve re-acceleration of ions that have slowed due to, for example, ion collisions. This latter situation may be obtained with a segmented device in accordance with the present invention.

The dimensions of the openings in the inner element are dependent generally on the length of the area over which dynamic confinement of charged particles is desired. Where the length of the area over which dynamic confinement of charged particles is desired corresponds to the length of the inner element or the outer element, the dimensions of the openings usually are dependent on the dimensions of the inner element and the outer element such as, for example, the length of the inner element or the segments thereof. As a general rule, the length of the openings in the inner element or a segment thereof should be large enough to achieve the electric potential field in accordance with the present invention over the area of the apparatus desired. The length of the openings is generally as long as permissible. The length of each of the openings is at least about 20% of the length of the second element or a segment thereof when the inner element is segmented. In various embodiments of the invention, the length of each of the openings is at least about 30%, at least about 40%, at least about 50%, at least about 60%, at least about 70%, at least about 80%, of the length of the inner element or a segment thereof when the inner element is segmented. Usually, for a segmented device at least one of the segments has openings that are at least about 50% of the length of such segment. Where the length of the area over which dynamic confinement of charged particles is desired is other than the length of the inner element or the outer element, such as, for example, in the case where the area is shorter than the length of the inner element or the outer element, the aforementioned percentages are applied to the area over which dynamic confinement is desired.

Accordingly, the shape of the openings is elongated so that the longest dimension of the opening is along the longitudinal axis of the inner element. Usually, the longest dimension of the opening is at least about 100% larger than, usually, about 200% to about 5000% larger than, the shorter dimension of the opening. Preferably, the openings are substantially rectangular in shape, which means that the sides of the openings are approximately parallel although the ends of the openings may be at right angles or may be curved. In general, the width of the openings is at least as large as or larger than the width of the spaces between the openings. Usually, the width of the openings is no more than about 50%, more usually, no more than about 20% larger than the width of the spaces between the openings. Preferably, the openings within an element or a segment thereof have approximately equal dimensions, which means that the dimensions vary by no more than about 20%, usually by no more than about 10%, more usually, by no more than about 5%.

Some or all of the openings in a single element or a single segment of an element may be tapered along their longest dimension. Usually, all of the openings are tapered where tapered openings are employed, but variation in taper is also contemplated. The extent of tapering is such that the variation in width of the opening is no more than about 40%, usually, about 20%, from one point to another along the longest dimension of the opening.

It is also within the scope of the present invention to have holes in the outer element of the apparatus. Such holes may be used for certain functions such as, for example, venting the apparatus or pumping. The holes in the outer element may be of any shape. Usually, the size of such holes are no greater than necessary to achieve the venting or pumping functions desired. Accordingly, the size of the holes in the largest cross-section is no more than about 90%, usually, no more than about 75%, of the size of the width of the spaces between the openings of the second element. The holes in the outer element should not overlap with openings in the inner element. The holes in the outer element may be covered with conductive mesh, as is known in the art.

The nature of the oscillating electric potential field created within the inside area of the inner element is also related to the nature and magnitude of the electrical voltages applied to the inner and the outer elements. The nature of the electrical voltages may be, for example, oscillating (such as, e.g., radio frequency (RF) and the like), direct current (DC), ground and so forth and mixtures thereof. However, at least one of the voltages applied to the inner or the outer element consists of an oscillating voltage component. The magnitudes of the electrical voltages also depend on the predetermined characteristics for the oscillating electric potential field to be generated. In addition, the magnitudes of the particular voltages applied depend on the size of the elements and the distance between the outer wall of the inner element and the inner wall of the outer element.

The following discussion is by way of illustration and not limitation. One skilled in the art will be able to select particular electrical voltages of appropriate magnitude based on the discussion herein to achieve oscillating electric potential fields of desired predetermined characteristics.

The predetermined characteristics of the oscillating electric potential field are a function of the intended use of the apparatus such as, for example, the manipulation of charged particles as discussed above. In one embodiment the oscillating electric potential field generated comprises a number of sub-fields. The number of sub-fields is directly related to the number of openings in the inner element and the voltages applied to the inner element and the outer element. The sub-fields may differ, for example, in polarity, in magnitudes or in magnitudes within a certain polarity. It should be noted, as mentioned above, that the potential fields and sub-fields produced in accordance with the present invention are a function of time but not of axial position. The fields vary in time but are constant in form along substantially the entire axis of the apparatus or a segment thereof. The fields differ significantly from those produced by Ose, et al., supra, because fields of Ose, et al., are primarily a function of axial position and not time, i.e., the field is static. The field of Ose, et al., is a DC field that is alternating through substantially the entire axis of the apparatus of Ose, et al.

The following discussion of typical oscillating electric potential fields is by way of illustration and not limitation.

In one embodiment the oscillating electric potential field is harmonic and the sub-fields have alternating polarity such as alternating positive and negative character where the reference is ground. However, the term "alternating polarity" includes the situation wherein the polarities of the sub-fields both have the same positive or negative character such as in the case of a DC offset where ground is offset by a component such as a DC voltage. The harmonic oscillating electric potential field arises from the application of generally opposing electrical voltages to the outer and inner elements, respectively. For example, where the number of openings in the inner element is three, there are produced six sub-fields of alternating positive and negative character. Four openings in the inner element yield eight sub-fields of alternating positive and negative character. Accordingly, as can be seen, the number of sub-fields produced is generally twice the number of openings in the inner element. These sub-fields may be generated by application of electrical energy that is oscillating, DC or mixtures thereof. However, as mentioned above, at least one voltage applied consists of an oscillating voltage component. Also, as mentioned above, one of the elements may be maintained at ground thus, in a simplistic sense, making the voltage applied equal to zero. As mentioned above, the field produced is substantially the same along an axis parallel to the central axis of the present apparatus.

In the above embodiment a beam of charged particles such as an ion beam sent axially through the aforementioned field experiences a transverse oscillating force, which varies in time and space. The motion of the charged particles in such a field is harmonic. Oscillatory motion of charged particles in multipole devices is well characterized in the art.

Due to the oscillation or oscillatory motion experienced by charged particles in the present invention, the charged particles are forced to stay inside of the inner element as they travel therethrough. Consequently, a beam of charged particles can be transmitted over a long distance without significant loss, which is important for achieving high instrument sensitivity.

In a particular embodiment of the present invention by way of example, radio frequency voltages of opposite polarities, $V_{in}=U_1+V_1\cos(\omega t)$ and $V_{out}=U_2-V_2\cos(\omega t)$ may be applied to the inner element and the outer element, respectively. In the above equations $V_{in}$ is the voltage on the inner element, $U_1$ is the applied DC voltage, $V_1$ is the amplitude of the applied RF voltage, $\omega/2\pi$ is frequency in Hz, t is elapsed time, $V_{out}$ is the voltage on the outer element, $U_2$ is the applied DC voltage, and $(-V_2)$ is the amplitude of the applied RF voltage. Typically, the absolute value of the voltage applied to the outer element is higher than that applied to the inner element, i.e., $|U_2|>|U_1|$ and $|V_2|>|V_1|$ (however, $U_1$ and/or $U_2$ may in fact be equal to zero and $V_2$ or $V_1$ may be equal to zero). The electric potential generated by the voltage of the outer element penetrates into the inner element through the openings, together with the potential generated by the inner element, to form a potential field of alternating polarity. In this embodiment, typical parameters are, for example, $\omega/2\pi$=about 500 kilohertz (kHz) to about 10 megahertz (MHz), $U_1$ and $U_2$=±about 0 to about 20 volts, $V_1$ and $V_2$=±about 400 volts. However, the maximum voltages applied can be as high as $U_1$ and $U_2$=±about 100 volts, $V_1$ and $V_2$=±about 1000 volts.

The elements are adapted for independent application of electrical voltages to the elements. Each of the elements can comprise an electrical lead such as, for example, a wire, trace, and the like.

Various embodiments of apparatus in accordance with the present invention will be described next, by way of example and not limitation, with reference to the appended drawings.

Figure 3:
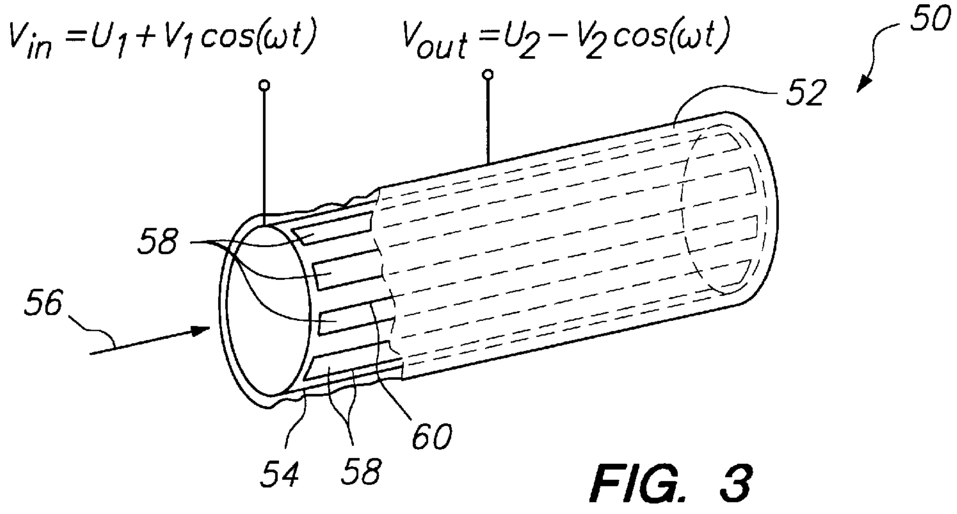
FIG. 3 is a drawing in perspective with partial cut-away of an embodiment of an apparatus in accordance with the present invention.

Referring to FIG. 3 apparatus 50 is depicted and is comprised of outer element 52 and inner element 54, which are shown in the form of cylindrical tubes coaxially aligned along axis 56. Inner element 54 has eight rectangular openings 58 in the wall of element 54. Openings 58 are disposed rectilinearly or in other words radially, with respect to axis 56. Accordingly, the longest dimension 60 of openings 58 is parallel to axis 56. Furthermore, openings 58 are disposed in an equidistant fashion in the wall of element 54. Apparatus 50 is depicted by way of example with voltages applied thereto to respective elements 52 and 54. Rf voltages $V_{in}$ and $V_{out}$ are independently applied to elements 54 and 52, respectively. In the embodiment shown by way of example, the voltage applied to element 52 is greater than that applied to element 54. At least one of the voltages applied to the elements has an oscillating component. The voltage changes polarity after a half period ($t=½[2\pi/\omega]$).

One of the elements may be at ground potential, preferably, element 54. It should be noted that the embodiment shown produces a symmetrical oscillating electric potential field. Accordingly, for this embodiment ions may be introduced into the apparatus from either end. The charged particles passing through apparatus 50 have an oscillating velocity component that is perpendicular to the axis of travel of the charged particles. In this way the charged particles do not impact the inner wall of element 54 and are confined within element 54.

Figure 4A:
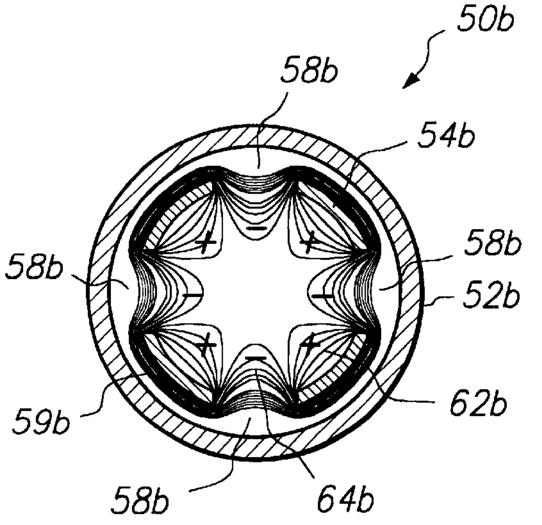
FIG. 4A is a computer simulation, at an instant in time, of an oscillating electric potential field generated by an embodiment of an apparatus in accordance with the present invention.
Figure 4B:
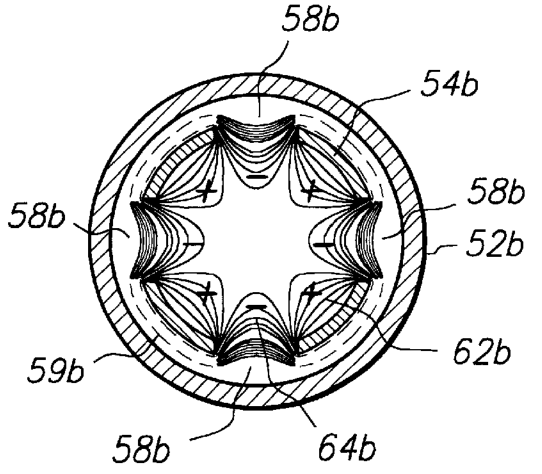
FIG. 4B is a depiction of the computer simulation of FIG. 4A wherein the potential field lines behind the inner electrodes are represented by two dashed lines and the cross-section of the cylindrical electrodes is defined with borders for purposes of clarification.

FIG. 4A is a computer simulation of an oscillating electric potential field produced by an apparatus 50*b* having outer element 52*b* and inner element 54*b*. Elements 52*b* and 54*b* are shown in the form of coaxially aligned hollow elements wherein the cross-section of each of the elements is circular. Inner element 54*b* has four rectangular openings 58*b*, one in each wall thereof. Openings 58*b* are equidistant from one another. Openings 58*b* are disposed radially with respect to the axis of element 54*b*. Apparatus 50*b* is depicted by way of example with voltages applied thereto to respective elements 52*b* and 54*b*. Eight sub-fields are shown having alternating positive 62*b* and negative 64*b* electric potential character. Note that in FIG. 4A the computer simulation of the potential distribution of the sub-field is only a snapshot for a particular moment in time. After a half cycle of the oscillation, the potential within each of the sub-fields changes polarity. FIG. 4B is a depiction of the computer simulation of FIG. 4A wherein the potential lines 59*b* behind the inner electrodes are represented by two dashed lines and the cross-section of the cylindrical electrodes is defined with borders for purposes of clarification.

Figure 5A:
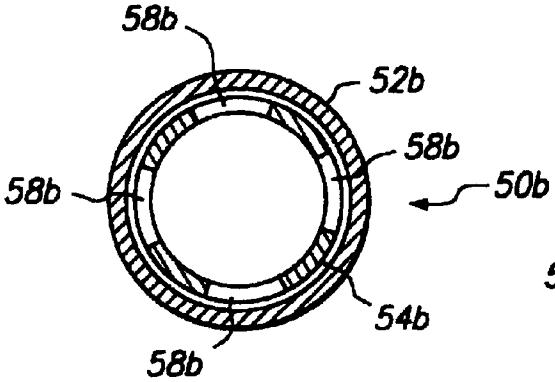
FIG. 5A is an embodiment of an apparatus of the present invention in cross-section.
Figure 5B:
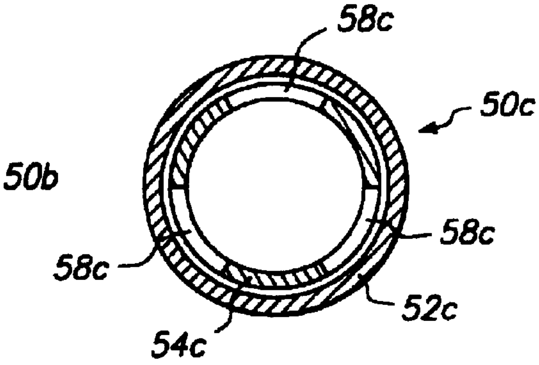
FIG. 5B is an alternative embodiment of an apparatus of the present invention in cross-section.

FIGS. 5A–5B depict in cross-section embodiments of apparatus in accordance with the present invention. FIG. 5A depicts the apparatus of FIG. 4. FIG. 5B depicts apparatus 50*c*, which is comprised of outer element 52*c* and inner element 54*c*, which are shown in the form of cylindrical tubes coaxially aligned along the axis of element 54*c*. Inner element 54*c* has three rectangular openings 58*c* in the wall of element 54*c*. Openings 58*c* are disposed rectilinearly with respect to the axis of element 54*c*. Furthermore, openings 58*c* are disposed in an equidistant fashion in the wall of element 54*c*.

Figure 6:
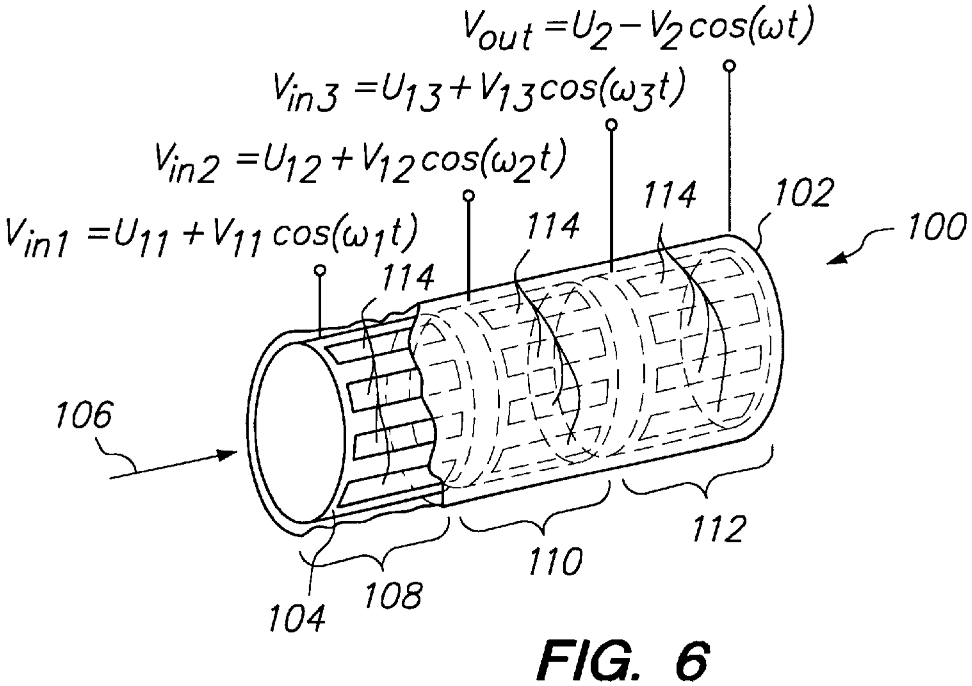
FIG. 6 is a drawing in perspective of an embodiment of an apparatus in accordance with the present invention wherein the inner element is segmented.

FIG. 6 is a drawing in perspective of an embodiment of an apparatus 100 in accordance with the present invention. Apparatus 100 comprises outer element 102 and inner element 104, which are shown in the form of cylindrical tubes coaxially aligned along the axis 106 of element 104. Inner element 104 is comprised of three segments 108, 110 and 112. Each of the segments has eight rectangular openings 114 in the wall thereof. Openings 114 are disposed rectilinearly with respect to axis 106. Furthermore, openings 114 are disposed in an equidistant fashion in the wall of each of segments 108, 110 and 112. Each of the segments is adapted to receive a different voltage. Apparatus 100 has particular application to collisional cooling and collisional focusing of charged particles. When charged particles collide with neutral gas molecules, the charged particles lose translational energy with a resulting slowing of velocity. Different voltages may be applied to segments 108, 110 and 112 to compensate for this loss of translational energy. For example, for positive ions a DC offset may be employed. In a particular example, $V_{11}$, $V_{12}$ and $V_{13}$, as well as $\omega_1$, $\omega_2$ and $\omega_3$, are equal and $U_{11}$ is greater than, e.g., 5 volts greater than, $U_{12}$, which in turn is greater than, e.g., 5 volts greater than, $U_{13}$. The length of the segments is discussed above.

Another application of this embodiment of the present invention is to store ions in the central section of the inner element. By applying DC voltage $U_{11}$ and $U_{13}$ at higher values than the voltage on $U_{12}$, such as, for example, 5 to 10 volts higher, a negative potential well is generated inside element 110 along the longitudinal axis. The voltages may be applied dynamically, for example, in a gating fashion, as is known in the art. Due to the potential well, ions are temporarily trapped in the well. Ion trapping may be facilitated by collisions with background gas molecules. This ion trap mode of operation is especially advantageous for accumulating ions for some dynamic mass spectrometric applications, such as, for example, time-of-flight mass spectrometry (TOF-MS) or Fourier Transform Ion Cyclotron mass spectrometry, to enhance the duty cycle.

Figure 7:
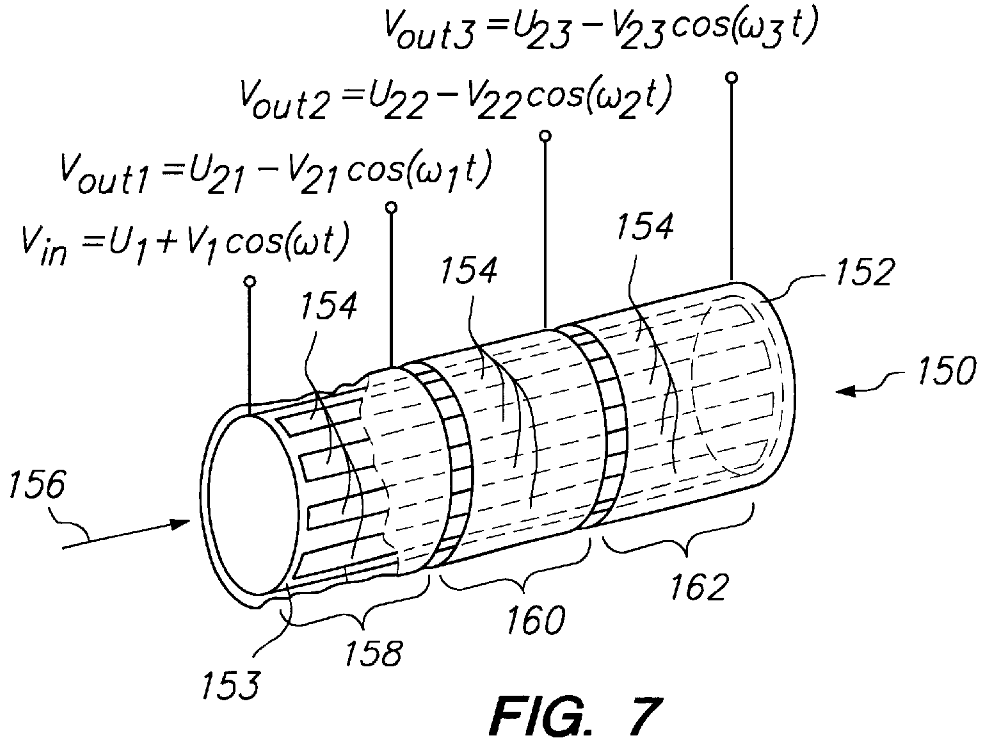
FIG. 7 is a drawing in perspective of an embodiment of an apparatus in accordance with the present invention wherein the outer element is segmented.

FIG. 7 is a drawing in perspective of an embodiment of an apparatus in accordance with the present invention wherein the outer element is segmented. Apparatus 150 comprises outer element 152 and inner element 153, which are shown in the form of cylindrical tubes coaxially aligned along the axis 156 of inner element 153. Outer element 152 is comprised of three segments 158, 160 and 162. Inner element 153 has eight rectangular openings 154 in the wall thereof. Openings 154 are disposed rectilinearly with respect to axis 156. Furthermore, openings 154 are disposed in an equidistant fashion in the wall of inner element 153. Each of segments 158, 160 and 162 is adapted to receive a different voltage in a manner similar to that described above for the apparatus of FIG. 6.

Figure 8:
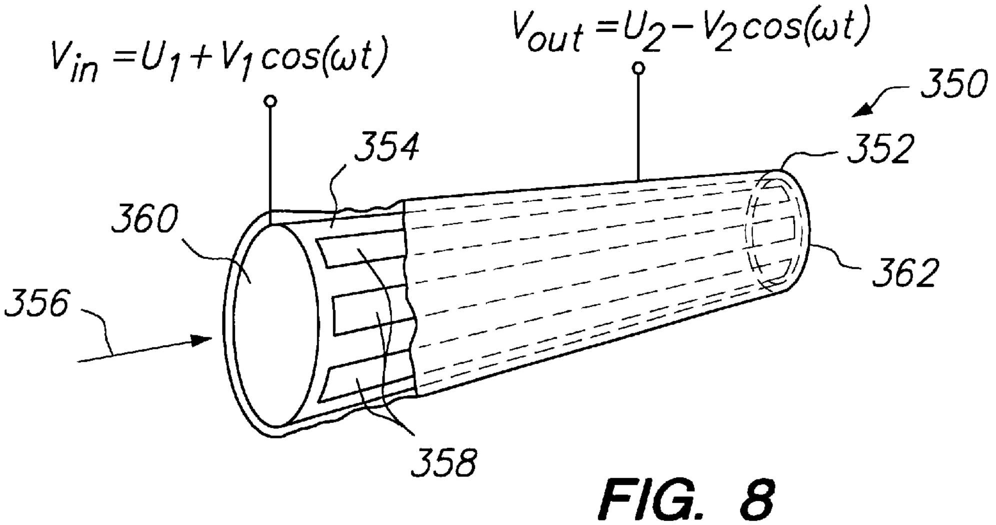
FIG. 8 is a drawing in perspective of an embodiment of an apparatus in accordance with the present invention wherein the inner element and outer element are tapered.

FIG. 8 is a drawing in perspective of an embodiment of an apparatus in accordance with the present invention wherein the inner element and outer element are tapered. Referring to FIG. 8 apparatus 350 is depicted and is comprised of outer element 352 and inner element 354, which are shown in the form of tubes coaxially aligned along axis 356. Inner element 354 has six rectangular openings 358 in the wall of element 354. Openings 358 are disposed rectilinearly, or in other words radially, with respect to axis 356. Furthermore, openings 358 are disposed in an equidistant fashion in the wall of element 354. Apparatus 350 is depicted by way of example with voltages applied thereto to respective elements 352 and 354. Both inner element 354 and outer element 352 are tapered so that the diameter at end 360 of apparatus 350 is larger than the diameter at the end 362 of apparatus 350. Apparatus 350 has particular application to collisional focusing of charged particles. To this end the beam of charged particles having a certain cross-sectional dimension is directed into the end 360 of apparatus 350. During collisional focusing the cross-sectional dimension of the beam narrows. With apparatus 350, the oscillating electric field is stronger with increasing distance along the axis of element 354 and the tapering of the element allows the narrowing beam to experience this stronger field.

Figure 9:
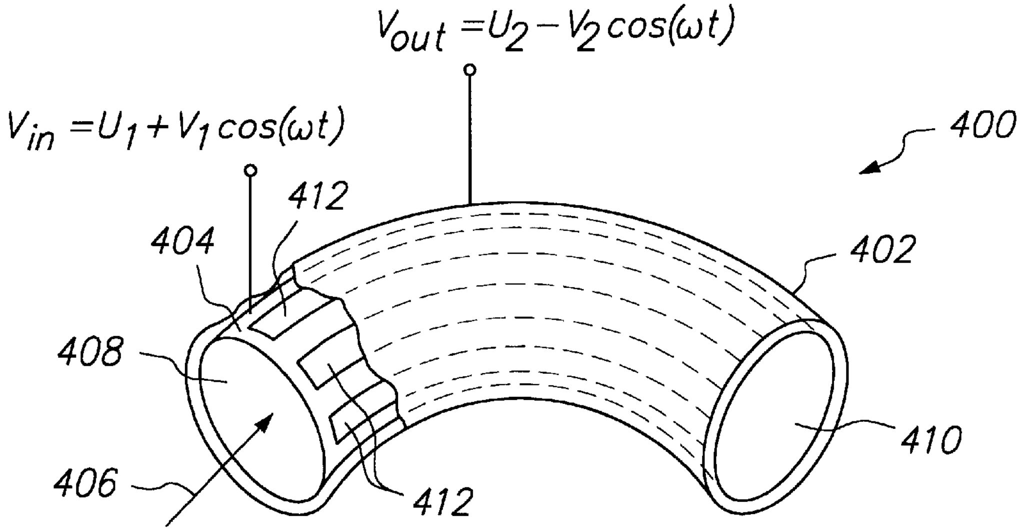
FIG. 9 is a drawing in perspective of an embodiment of an apparatus in accordance with the present invention wherein the inner element and outer element are non-linear.

FIG. 9 is a drawing in perspective of an embodiment of an apparatus in accordance with the present invention wherein the inner element and outer element are curved. Referring to FIG. 9 apparatus 400 is depicted and is comprised of outer element 402 and inner element 404, which are shown in the form of tubes coaxially aligned. Both inner element 404 and outer element 402 are curved so that the plane formed by the end 408 of apparatus 400 is at approximate right angles with the plane formed by end 410 of apparatus 400. Inner element 404 has six rectangular openings 412 in the wall of element 404. Openings 412 are disposed rectilinearly, or in other words radially, with respect to axis 406. Furthermore, openings 412 are disposed in an equidistant fashion in the wall of element 404. Apparatus 400 is depicted by way of example with voltages applied thereto to respective elements 402 and 404. Apparatus 400 has particular application to situations where it is desired to change direction of the beam of charged particles. For example, the mechanical design may be achieved so that a mass spectrometer can be built more compactly. Another advantage of the embodiment is its use in charge separation. For example, when the beam is introduced into the apparatus together with a neutral gas, it is desirable to separate neutral species from charged species. So the neutral species are not introduced into the mass analyzer, the background caused by neutral ions can be reduced. A similar rejection may be achieved for high energy species. In the embodiment of FIG. 9, the charged particles follow the curvature of apparatus 400 whereas neutral species and high energy species do not.

Figure 10:
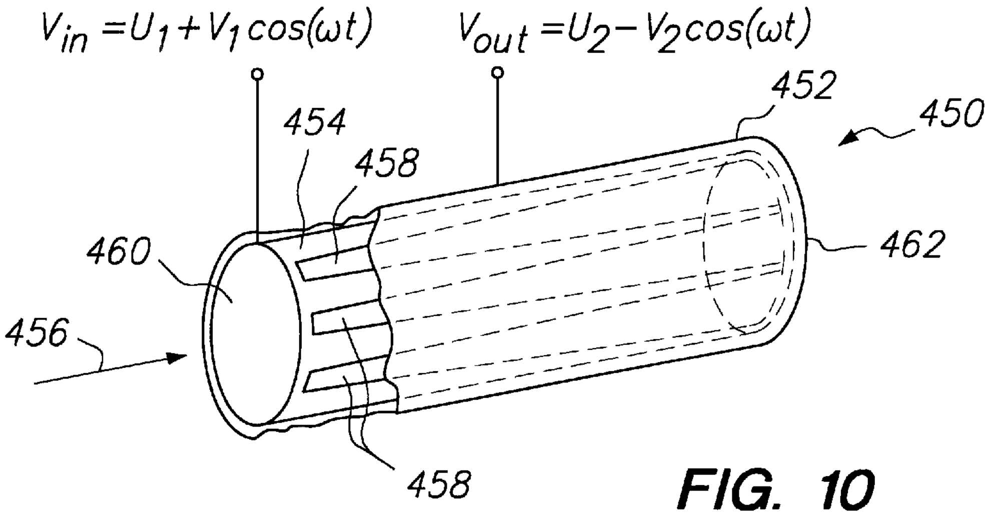
FIG. 10 is a drawing in perspective of an embodiment of an apparatus in accordance with the present invention wherein the openings are tapered.

FIG. 10 is a drawing in perspective of an embodiment of an apparatus in accordance with the present invention wherein the openings are tapered. Referring to FIG. 10 apparatus 450 is depicted and is comprised of outer element 452 and inner element 454, which are shown in the form of tubes coaxially aligned along axis 456. Inner element 454 has six rectangular openings 458 in the wall of element 454. Openings 458 are disposed rectilinearly, or in other words radially, with respect to axis 456. Furthermore, openings 458 are tapered, i.e., the width of openings 458 at end 462 of apparatus 450 is larger than the width of openings 458 at end 460 of apparatus 450. Apparatus 450 is depicted by way of example with voltages applied thereto to respective elements 452 and 454. In use, the larger width of openings 458 at end 462 permits greater penetration of the electric potential generated by element 452 than at end 460. For example, when the voltage applied to element 452 is negative, there is more penetration at end 462 providing for increased acceleration of the charged particles in the axial direction. This is important in collisional focusing and collisional cooling of charged particles.

Figure 11:
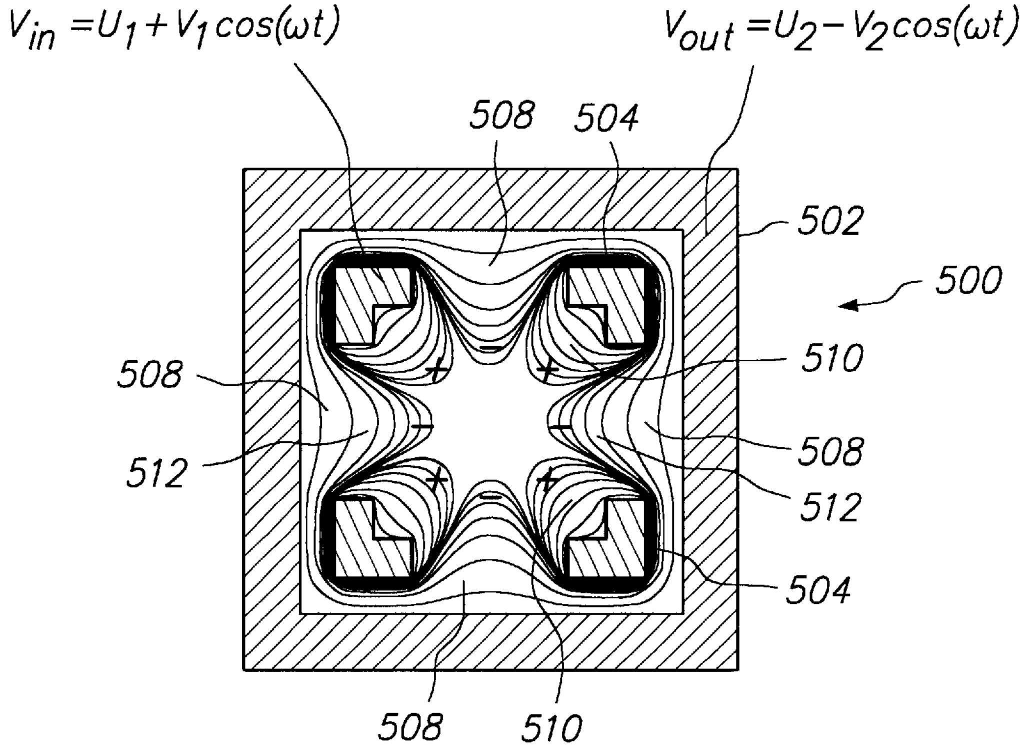
FIG. 11 is a computer simulation, at an instant in time, of an oscillating electric potential field generated by an embodiment of an apparatus in accordance with the present invention.

FIG. 11 is a computer simulation, at an instant in time, of an oscillating electric potential field produced by an apparatus 500 having outer element 502 and inner element 504. Elements 502 and 504 are shown in the form of coaxially aligned hollow elements wherein the cross-section of each of the elements is square. Inner element 504 has four rectangular openings 508, one in each wall thereof. Openings 508 are equidistant from one another. Openings 508 are disposed radially with respect to the axis of element 504. Apparatus 500 is depicted by way of example with voltages applied thereto to respective elements 502 and 504. Eight sub-fields are shown having alternating positive 510 and negative 512 character.

Figure 12:
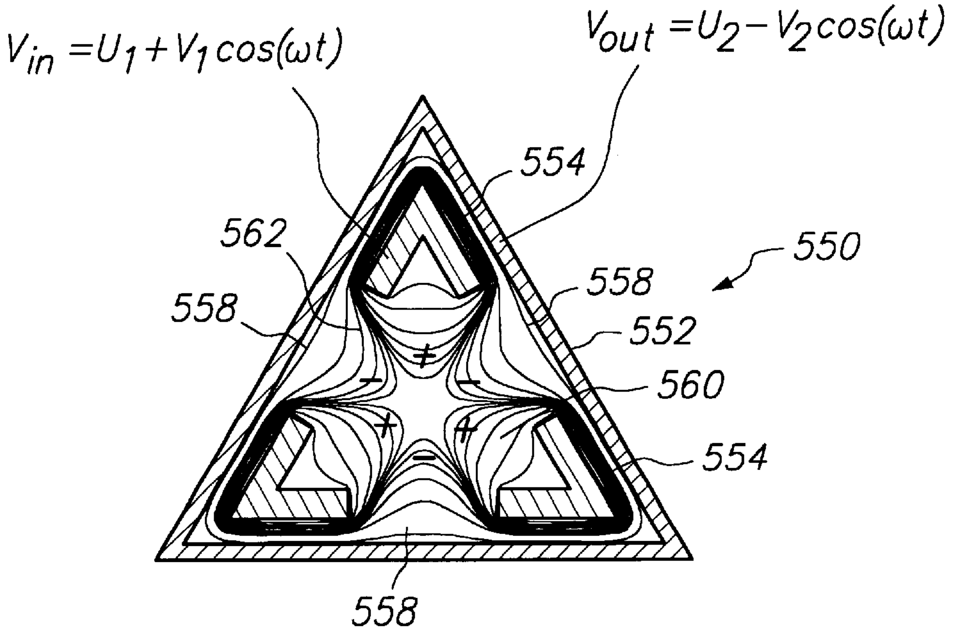
FIG. 12 is a computer simulation, at an instant in time, of an oscillating electric potential field generated by an embodiment of an apparatus in accordance with the present invention.

FIG. 12 is a computer simulation, at an instant in time, of an oscillating electric potential field produced by an apparatus 550 having outer element 552 and inner element 554. Elements 552 and 554 are shown in the form of coaxially aligned hollow elements wherein the cross-section of each of the elements is triangular. Inner element 554 has three rectangular openings 558, one in each wall thereof. Openings 558 are equidistant from one another. Openings 558 are disposed radially with respect to the axis of element 554. Apparatus 550 is depicted by way of example with voltages applied thereto to respective elements 552 and 554. Six sub-fields are shown having alternating positive 560 and negative 562 character. Apparatus 550 functions in principle in a manner similar to that for the apparatus of FIG. 5B. As mentioned above, the shape of the elements is a design choice based on mechanical considerations and the like.

Figure 13:
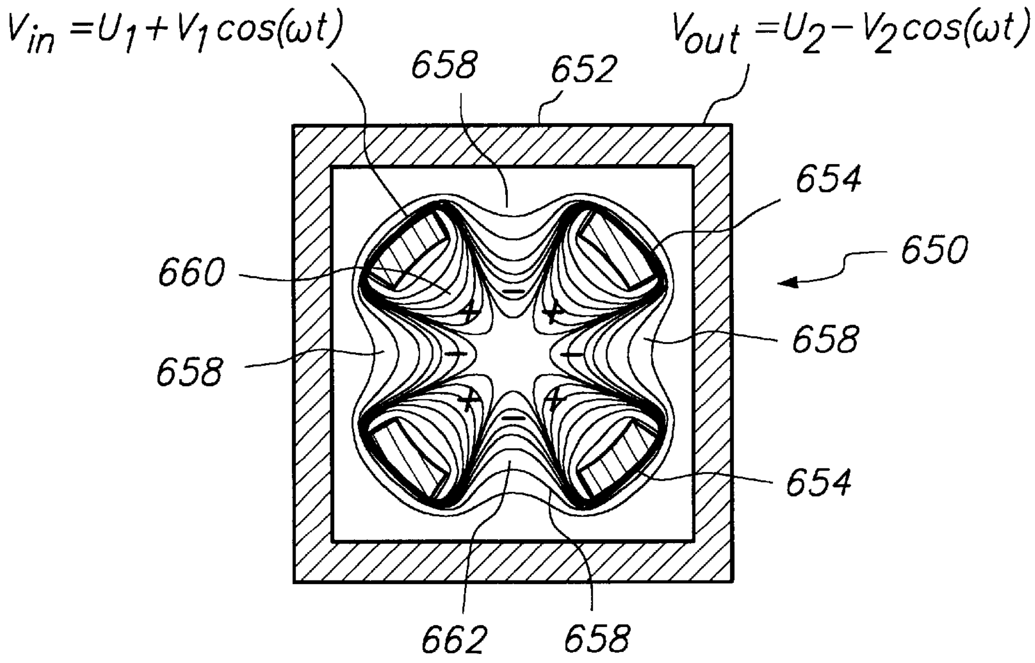
FIG. 13 is a computer simulation, at an instant in time, of an oscillating electric potential field generated by an embodiment of an apparatus in accordance with the present invention.

FIG. 13 is a computer simulation, at an instant in time, of an electric potential field produced by an apparatus 650 having outer element 652 and inner element 654. Elements 652 and 654 are shown in the form of coaxially aligned hollow elements wherein the cross-section of outer element 652 is rectangular and the cross-section of inner element 654 is circular. Inner element 654 has four openings 658 equally spaced in the cylindrical wall thereof. Openings 658 are disposed radially with respect to the axis of element 654. Apparatus 650 is depicted by way of example with voltages applied thereto to respective elements 652 and 654. Eight sub-fields are shown having alternating positive 660 and negative 662 character. The character of the oscillating electric potential field produced by the apparatus of FIG. 13 is similar to that produced by the apparatus of FIG. 4.

Figure 14:
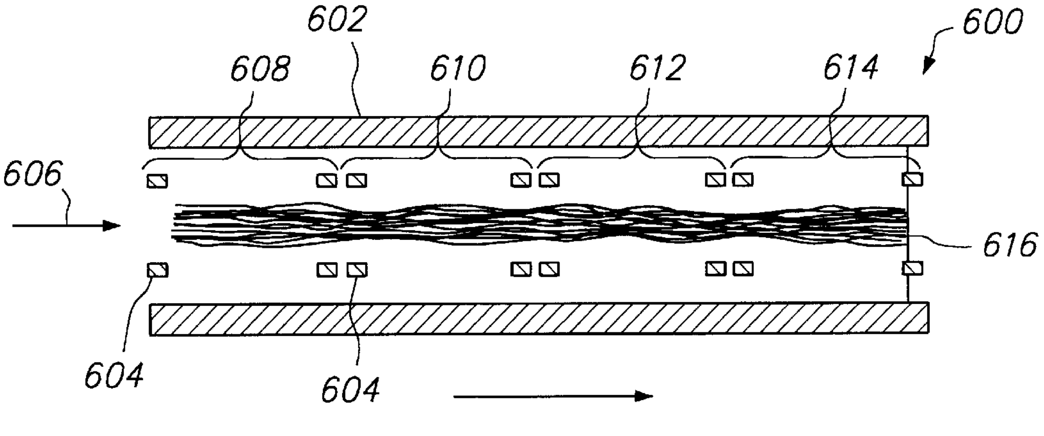
FIG. 14 is a depiction of a computer simulation of ion cooling through an apparatus in accordance with the present invention.

FIG. 14 is a depiction of a computer simulation of ion cooling through an apparatus in accordance with the present invention. Apparatus 600 comprises outer element 602 and inner element 604, which are shown in the form of cylindrical tubes coaxially aligned along axis 606 of element 604. Inner element 604 is comprised of four segments 608, 610, 612 and 614. Each of the segments has four rectangular openings in the cylinder wall. The openings are disposed rectilinearly with respect to axis 606. Furthermore, the openings are disposed in an equidistant fashion in the wall of each of segments 608, 610, 612 and 614. Each of the segments is adapted to receive a different voltage. Ion beam 616 is shown within inner element 614. In the computer simulation, the trajectories of twenty ions are calculated and an ion transmission efficiency of 100% is obtained.

Figure 15:
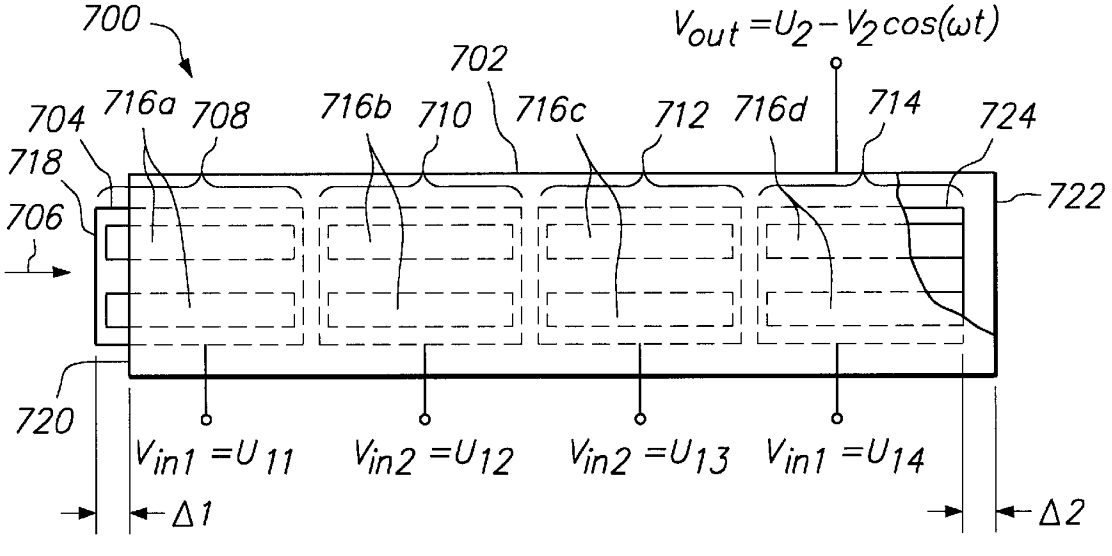
FIG. 15 is a drawing in perspective of an embodiment of an apparatus in accordance with the present invention wherein the inner element is segmented.

FIG. 15 is a drawing in perspective of an embodiment of an apparatus 700 in accordance with the present invention. Apparatus 700 comprises outer element 702 and inner element 704, which are shown in the form of cylindrical tubes coaxially aligned along the axis 706 of element 704. Inner element 704 is comprised of four segments 708, 710, 712 and 714. Each of the segments has four rectangular openings 716 in the wall thereof (716*a*, 716*b*, 716*c* and 716*d*, respectively). Openings 716*a*, 716*b*, 716*c* and 716*d* are disposed rectilinearly with respect to axis 706. Furthermore, openings 716 are disposed equidistantly in the wall of each of segments 708, 710, 712 and 714. Each of the segments is adapted to receive a different voltage. End portion 718 of element 704 extends beyond the end portion 720 of element 702 by a distance indicated as Δ1. Furthermore, end portion 722 of outer element 702 extends beyond end portion 724 of inner element 704 by a distance Δ2. In segment 714 openings 716*d* extend to the end 724 of inner element 704. For positive ions the relationship of the voltages may be as follows: $V_{in1}>V_{in2}>V_{in3}>V_{in4}$. The relationship may be reversed for negative ions. In general, the voltages are chosen so that ions within the apparatus are constantly accelerated in the direction of the exit of the apparatus. The voltages should not adversely affect transport of ions into or out of the apparatus. Voltages should be consistent with desired operation to create field penetration to create a field emulating that of a multipole structure. By way of illustration and not limitation, typical parameters for the apparatus of FIG. 15 when applied to the focusing of an ion beam are as follows: length of segments 708–714=21 mm, length of outer element 702=110 mm, length of openings 716*a*–716*c*=20 mm, length of opening 716*d*=20.5 mm, width of openings 716*a*–716*d*=1.8 mm, $\omega/2\pi$=2.55 MHz, $U_{11}=U_{12}=U_{13}=U_{14}$=3 volts, V1 =0, U2 =−10 volts and V2 =−600 volts, Δ1=about 2 to 3 millimeters and Δ2=about 2 to 3 millimeters.

Figure 16:
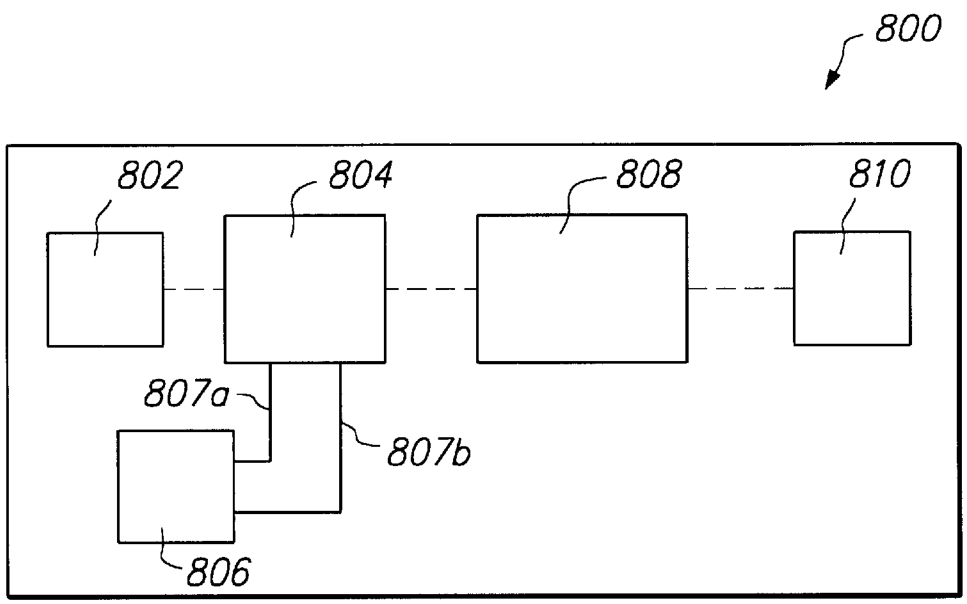
FIG. 16 is a schematic drawing depicting a mass spectrometry apparatus in accordance with the present invention.

Another embodiment of the present invention is a mass spectroscopy apparatus such as depicted in FIG. 16. A mass spectrometry apparatus 800 in accordance with the present invention comprises an ion source 802 for producing ions, an apparatus 804 for manipulating the ions, an electrical source 806 for independently applying voltages to elements of the apparatus by means of electrical leads 807*a* and 807*b*, a mass analyzer 808, and optionally a detector 810 depending on the nature of the mass analyzer. Apparatus 804 for manipulating ions generally is adjacent ion source 802 and in one embodiment is placed between ion source 802 and mass analyzer 808. The apparatus for manipulating the ions comprises a tubular first element and a tubular second element. The second element is coaxially disposed within the first element. The second element has two to eight openings in a wall thereof wherein the openings are elongated and radially disposed with respect to the axis of the second element. The first element and the second element each are adapted independently to receive a voltage to generate within the second element an electric potential having predetermined characteristics. The mass spectrometer may have one or multiple vacuum chambers or stages, as can the apparatus for manipulating ions 804. Usually, the pressure within the apparatus for manipulating ions is equal to or less than the pressure within the ion source and is equal to or greater than the pressure within the mass analyzer. Accordingly, the apparatus is adapted to be pressurized by introduction of a gas. Such adaptations to introduce a gas into apparatus for mass spectrometry are well-known in the art and will not be mentioned here. It should be noted that the present apparatus without introduction of a gas may yield confinement of ions therein but will not focus such ions.

The ion source is usually a device for forming ions from a sample to be analyzed. The ions may be formed into a collimated ion beam. Ion sources as a means for producing ions include, by way of illustration and not limitation, electrospray source, photoionization source, MALDI source, bombardment of a sample with an electron beam using ionization energy that may be continuous or pulsed, atmospheric pressure chemical ionization, plasma source, and the like.

The apparatus of the present invention may be utilized in mass spectrometry applications where manipulation of ions is carried out as part of the mass spectrometric analysis. The mass analyzer may be a mass spectrometer such as, by way of example and not limitation, time-of-flight (TOF), ion trap, quadrupole, magnetic sector, Fourier-Transform (FT)-Ion Cyclotron Resonance (ICR), and the like.

The detector is usually a device for recording ions that are subjected to acceleration and deflection forces in mass spectrometry, as is commonly known in the art.

As mentioned above, a buffer (or background) gas, usually a neutral gas, typically nitrogen, argon, neon and the like, is employed inside the apparatus particularly in the application of the present apparatus to collisional cooling, collision focusing, collision induced dissociation and the like. The charged particles are introduced into the apparatus in the presence of a neutral gas. For example, the neutral gas may be introduced into the apparatus prior to introduction of the charged particles. In some circumstances, alternatively, the neutral gas is introduced into the charged particles prior to the introduction of the charged particles into the apparatus. The pressure of the neutral gas is sufficient to provide that the mean free path of the ion is smaller that the length of the inner element. The term "mean free path" means the average distance a particle travels between successive collisions with other particles. Usually, the mean free path of the ion is at least about 8 times smaller, more usually, about 10 times smaller than the length of the inner element. When the buffer gas is introduced into the aforementioned field, it causes ions to collide with the buffer gas molecules. As a result, the ions lose a portion of their translation energy. Such collision results in homogenization of the ion energy. A narrow energy distribution and a narrow spatial distribution are crucial to obtain a high mass resolution in many types of mass spectrometers. In collisional ion focusing an ion beam with a large cross-section collides with buffer gas molecules with a resultant loss of radial energy. The ion beam collapses into a smaller radius and is, thus, focused. In ion beam cooling, collisions of the ions with buffer gas result in thermalization of the ion energies, leading to reduced ion energy spread upon restoration of axial energy by acceleration.

As mentioned above, one embodiment of the present invention is a method for cooling charged particles. In the method the charged particles are directed from a source thereof, together with a buffer gas, into a tubular second element of an apparatus, which comprises a tubular first element and the tubular second element. The latter element is coaxially disposed within the first element The second element has at least two openings in a wall thereof wherein the openings are elongated and radially disposed with respect to the axis of the second element. The length of each of the openings is at least about 20% of the length of the second element and the dimensions of the openings are approximately equal. The pressure of the buffer gas is sufficient to provide that the mean free path of the ion is smaller than, usually, about one eighth or more of the length of the second element. Voltages are applied independently to the first element and the second element to generate an oscillating electric potential field having predetermined characteristics sufficient to bring into harmonic motion the charged particles passing through the second element to contain and focus such particles.

When operated at higher background pressure, the charged particles traversing the length of an apparatus in accordance with the present invention experience a number of collisions with the background gas resulting in the cooling of the kinetic energy of the charged particles. The background gas is introduced into the apparatus generally by introducing the background gas into the charged particles that are to be introduced into the apparatus. The introduction of such background gas is well known in the art and will not be discussed in further detail.

As charged particles enter the apparatus of the invention and are transmitted through it, the electrical field generated effectively prevents the charged particles from dispersing in the radial direction due to collisions with the background gas, permitting net movement of ions in the axial direction. Axial motion of the ions is often driven by the gas dynamics. Charged particles that experience a number of low energy collisions with the neutral gas within the apparatus of the invention have their kinetic energy reduced resulting in a narrowing of the energy spread of the charged particles that exit the apparatus. The number of collisions that a charged particle undergoes as it traverses the length of the apparatus is a function of the length of the apparatus and the background pressure inside the inner element of the apparatus. Typically, at least ten collisions are required to adequately cool an ion of mass about 100 to about 1000 AMU. The number of collisions that take place is a relatively complicated gas dynamic process that is covered by parameters such as ion mass, ion charge, molecule type and background pressure. For example, for a background pressure of about $10^{-3}$ torr in nitrogen, 500 amu, 5 eV of ion energy, ion guide length for cooling of about 100 millimeters, the inner diameter of the inner element is about 1 to about 10 millimeters, more usually about 2 to about 5 millimeters. The gap between the elements is similar to that described above.

To achieve cooling of charged particles an appropriate electrical field is generated. To this end voltages are applied to the inner element and the outer element. In addition, the outer element or the inner element, preferably, the inner element, may be segmented. Typically, at least one of the voltages has an oscillating voltage component. If relative voltages of the components are appropriately selected, the charged particles entering the present apparatus will have similar energy spreads and will be transmitted to the exit of the apparatus with the same efficiency. With the present apparatus operated in a higher vacuum pressure region where collisional cooling occurs, the narrow energy spread of the charged particles can be maintained independent of changes in the mean energy of the charged particles when the electrical field is properly adjusted.

In a particular aspect, relative energy spread, which is defined as the ratio of absolute energy spread to mean energy can be significantly reduced. Narrow energy spread is an important aspect in achieving high mass resolution in many types of mass spectrometers, such as, for example, TOF-MS and magnetic sector field instruments.

A particular example of ion cooling using apparatus 600 depicted in FIG. 14 is next described by way of illustration and not limitation. By introducing a buffer gas (helium, argon, nitrogen, etc.) of certain pressure (typically, 1 to $10^{-3}$ torr) into inner element 604, ions of harmonic motion collide with the gas molecules. This results in homogenized ion energy (cooling) similar to that produced by the conventional apparatus. The dimensions of apparatus 600 and the conditions of use are summarized as follows: Inner element 604 has an inner diameter of 4 mm, an outer diameter of 5 mm, a segment length of 8 mm, a gap between the segments of 0.5 mm. Outer element 602 has an 8 mm inner diameter and a 10 mm outer diameter. While only DC voltage is applied to the inner tube ($V_1=0$), a 2 MHz RF voltage of magnitude 600 V together with −5 V DC voltage is applied to the outer tube. To make up the energy loss the DC voltages on each segment decline 5 V in the direction of ion travel. In this example nitrogen of 0.05 torr pressure is introduced as the collision gas. The ion trajectories show that 20 ions of mass 500 amu and energy of 5 eV with 10% energy spread are sent through inner element 604. All 20 ions are transmitted through the inner element (100% transmission) and the ion energy spread is reduced to the thermal energy, i.e., less than 1% of the average ion energy.

The apparatus of the present invention may be employed in systems in which charged particles are transferred through one or more vacuum stages or chambers while allowing neutral background gas to be pumped away. In that regard the present apparatus may be disposed between two or more vacuum chambers. This embodiment has application to atmospheric pressure ion sources (API) that produce ions from analyte species in a region that is approximately at atmospheric pressure. Such sources include, for example, electrospray (ES), atmospheric pressure chemical ionization (APCI), inductively coupled plasma (ICP) ion sources. The ions are then transported into vacuum for mass analysis.

Figure 17:
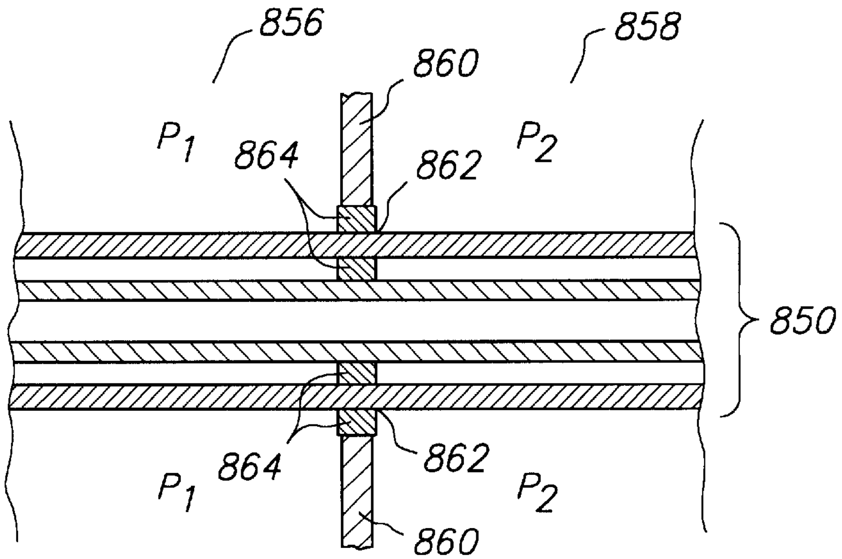
FIG. 17 is a drawing in cross-section depicting an embodiment of an apparatus in accordance with the present invention wherein the apparatus is disposed between two vacuum chambers.

FIG. 17 depicts in cross-section a portion of an embodiment of the invention by way of example and not limitation. Apparatus 850 of the invention comprises outer element 852 and inner element 854 configured with openings consistent with the present invention. Apparatus 850 is disposed between vacuum chambers 856 and 858, respectively. Wall 860 separates vacuum chambers 856 and 858 and has passageway 862 through which apparatus 850 passes. Seals or insulators 864 are disposed around outer element 852 and inner element 854 to provide a seal between chambers 856 and 858. Chamber 856 is maintained at pressure $P_1$ and chamber 858 is maintained at pressure $P_2$ where $P_1$ is greater than $P_2$. Pressures are maintained in the vacuum chambers by conventional pumps (not shown). The operation of ion guides in multiple vacuum stages is discussed in U.S. Pat. No. 5,962,851, the relevant disclosure of which is incorporated herein by reference.

Another embodiment of the present invention is a method for subjecting charged particles to collision induced dissociation (CID). The ability to fragment molecular ions by CID in the gas expansion region in vacuum stages of a mass spectrometer is an important analytical tool. Valuable structural information can be obtained from CID of molecular ions produced from a number of ion sources utilizing, for example, electrospray, atmospheric pressure ionization, atmospheric pressure chemical ionization, electron impact or chemical ionization, laser desorption ionization, and the like. This analysis has been found to be useful for such purposes as structure elucidation, mixture analysis and determination of isotopic labeling.

In the application of the present invention to CID, charged particles from a source thereof, together with a buffer gas, are directed into a tubular second element of an apparatus comprising a tubular first element and the tubular second element, which is coaxially disposed within the first element. The second element has at least two openings in a wall thereof wherein the openings are elongated and radially disposed with respect to the axis of the second element. Typically, the buffer gas (helium, argon, nitrogen, etc.) is of certain pressure (typically, about 1 to about $10^{-3}$ torr). The length of the openings is at least about 20% of the length of the second element. A preferred embodiment for this aspect of the present invention is an apparatus having at least two segments.

As in the case of ion cooling, CID is a process governed by many molecular and instrumental parameters, as well as molecular structure. Generally, changes to parameters lead to changes in fragment patterns. One skilled in the art will be able to determine particular parameters for particular applications based on the disclosure herein and the knowledge of the art. Typically, for mass spectrometry applications the diameter of the inner element is about 3 to about 8 millimeters and the total length of the inner element is about 100 to about 200 millimeters.

Voltages are applied independently to the first element and the second element to generate an oscillating electric potential field having predetermined characteristics sufficient to contain the charged particles passing through the second element so that the particles can undergo collision induced dissociation. CID conditions can be set by adjusting relative potentials of the inner and outer elements of the present apparatus and those potentials with respect to the initial ion energy. At least one of the voltages comprises an oscillating voltage component. In this embodiment at least one of the elements is preferably segmented to provide for an axial field to assist transport of the fragments produced during CID. It is within the purview of the present invention to use multiple apparatus in accordance with the present invention placed between mass spectrometers to form multistage MS instrument (MSN). For a discussion of multistage MS instruments see U.S. Pat. No. 4,234,791, the relevant disclosure of which is incorporated herein by reference.

It should be noted that voltages referred to above are for positive ions. For negative ions, voltages are of opposite polarity, i.e., the signs of the voltages are reversed from the corresponding values for positive ions.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An apparatus for manipulating charged particles, when present, comprising:

(a) a hollow first element, and (b) a hollow second element, said second element being disposed within said first element, said second element having at least two openings through a wall thereof wherein said openings are elongated in a direction that is substantially parallel to the longitudinal axis of said second element, wherein said openings are distributed around a circumference of said element, wherein the length of said openings are at least about 20% of the length of said second element, and wherein said openings of said second element allow an electric field resulting from the application of electrical voltages to said first element and said second element to enter an area within said second element and generate within said second element an oscillating electric potential field having predetermined characteristics that manipulates charged particles, when present.

2. An apparatus according to claim 1 wherein said second element has from three to eight openings in said wall thereof.

3. An apparatus according to claim 1 wherein said openings have dimensions that are approximately equal.

4. An apparatus according to claim 1 wherein said second element comprises at least two individual segments and each of said segments has at least two openings in said wall thereof wherein the length of said openings is at least about 20% of the length of said segments.

5. An apparatus according to claim 4 wherein each of said segments are independently adapted to receive a voltage.

6. An apparatus according to claim 1 wherein the length of said openings is at least about 50% of the length of said second element.

7. An apparatus according to claim 1 wherein said openings are evenly distributed in said wall of said second element.

8. An apparatus according to claim 1 wherein said first element and said second element are tapered with respect to their axes.

9. An apparatus according to claim 1 wherein said first element and said second elements are straight with respect to their axes.

10. An apparatus according to claim 1 wherein said first element and said second elements are curved with respect to their axes.

11. An apparatus according to claim 1 wherein said openings are tapered with respect to their longest dimension.

12. An apparatus according to claim 1 wherein said first element has at least two segments.

13. An apparatus according to claim 1 wherein said first element and said second element are metal cylinders.

14. A mass spectroscopy apparatus comprising an apparatus according to claim 1.

15. An apparatus for manipulating charged particles, when present, comprising:

(a) a tubular first element, and (b) a tubular second element, said second element being coaxially disposed within said first element, said second element having from two to eight openings through a wall thereof wherein said openings are elongated in a direction that is substantially parallel to the longitudinal axis of said second element, wherein said openings are distributed around a circumference of said element, wherein the length of each of said openings is at least about 20% of the length of said second element and wherein said openings of said second element allow an electric field resulting from the application of electrical voltages to said first element and said second element to enter an area within said second element and generate within said second element an oscillating electric potential field having predetermined characteristics that manipulates charged particles, when present.

16. An apparatus according to claim 15 wherein said second element comprises at least two individual segments and each of said segments has from two to eight openings in said wall thereof wherein the length of said openings is at least about 20% of the length of said segments.

17. An apparatus according to claim 16 wherein said first element and said second element are metal cylinders and wherein the ends of said first element and said second element are not coplanar.

18. A mass spectroscopy apparatus comprising:

(a) an ion source, (b) an apparatus adjacent said ion source, said apparatus comprising (i) a tubular first element and (ii) a tubular second element, said second element being coaxially disposed within said first element, said second element having two to eight openings through a wall thereof wherein said openings are elongated in a direction that is substantially parallel to the longitudinal axis of said second element, wherein said openings are distributed around a circumference of said element, wherein the length of each of said openings is at least about 20% of the length of said second element, and wherein said openings of said second element allow an electric field resulting from the application of electrical voltages to said first element and said second element to enter an area within said second element and generate within said second element an oscillating electric potential field having predetermined characteristics, (c) an electrical source for independently applying voltages to said first element and said second element, and (d) a mass analyzer adjacent said apparatus of (b).

19. An apparatus according to claim 18 wherein said openings have dimensions that are approximately equal.

20. An apparatus according to claim 18 wherein said second element has at least two segments and each of said segments has from two to eight openings in said wall of thereof.

21. An apparatus according to claim 20 wherein said first element and said second elements are straight.

22. An apparatus according to claim 20 wherein said first element and said second element are metal cylinders.

23. A method for creating an oscillating electric potential field having sub-fields of alternating polarity for manipulating charged particles, when present, said method comprising:

(a) applying a first voltage to a second element of an apparatus comprising (i) a first element and (ii) said second element, said second element being coaxially disposed within said first element, said second element having at least two openings through a wall thereof wherein said openings are elongated in a direction that is substantially parallel to the longitudinal axis of said second element, wherein said openings are distributed around a circumference of said element and wherein the length of each of said openings is at least about 20% of the length of said second element and wherein the dimensions of said openings are approximately equal, and (b) applying a second voltage to said first element to generate within said second element an oscillating electric potential field having sub-fields of alternating polarity that manipulates charged particles, when present, wherein at least one of said voltages has an oscillating voltage component.

24. A method according to claim 23 wherein said first element and said second element are cylindrical.

25. A method for transporting charged particles, when present, said method comprising:

(a) directing charged particles from a source thereof into a tubular second element of an apparatus comprising (i) a tubular first element and (ii) said tubular second element, said second element being coaxially disposed within said first element, said second element having at least two openings through a wall thereof wherein said openings are elongated in a direction that is substantially parallel to the longitudinal axis of said second element, wherein said openings are distributed around a circumference of said element and wherein the length of each of said openings is at least about 20% of the length of said second element and wherein the dimensions of said openings are approximately equal, and (b) applying voltages independently to said first element and said second element to generate an oscillating electric potential field having predetermined characteristics sufficient to confine said charged particles, when present, during transport through said second element.

26. A method according to claim 25 wherein said voltage applied to said first element comprises an oscillating voltage component.

27. A method according to claim 25 wherein said charged particles are confined by an oscillating electric potential field having an oscillating force in a direction transverse to the direction of travel of said charged particles.

28. A method according to claim 25 wherein the length of each of said openings is at least 50% of the length of said second element.

29. A method for cooling charged particles, said method comprising:

(a) directing charged particles from a source thereof into a tubular second element of an apparatus in the presence of a neutral gas, said apparatus comprising (i) a tubular first element and (ii) said tubular second element, said second element being coaxially disposed within said first element, said second element having at least two openings through a wall thereof wherein said openings are elongated in a direction that is substantially parallel to the longitudinal axis of said second element, wherein said openings are distributed around a circumference of said element and wherein the length of each of said openings is at least about 20% of the length of said second element, the pressure of said neutral gas being sufficient such that the mean free path of the ion is smaller than the length of said second element, and (b) applying voltages independently to said first element and said second element to generate an oscillating electric potential field having predetermined characteristics sufficient to bring into harmonic motion said charged particles passing through said second element.

30. A method according to claim 29 wherein said voltage applied to said first element comprises an oscillating voltage component.

31. A method according to claim 29 wherein said charged particles are subjected to harmonic oscillation by an oscillating electric potential field having sub-fields of alternating polarity.

32. A method for subjecting charged particles to collision induced dissociation, said method comprising:

(a) directing charged particles from a source thereof into a tubular second element of an apparatus in the presence of a neutral gas, said apparatus comprising (i) a tubular first element and (ii) said tubular second element, said second element being coaxially disposed within said first element, said second element having at least two openings through a wall thereof wherein said openings are elongated in a direction that is substantially parallel to the longitudinal axis of said second element, wherein said openings are distributed around a circumference of said element and wherein the length of each of said openings is at least about 20% of the length of said second element, the pressure of said neutral gas being sufficient such that the mean free path of the ion is smaller than the length of said second element, and (b) applying voltages independently to said first element and said second element to generate an oscillating electric potential field having predetermined characteristics sufficient to confine said charged particles passing through said second element during collision induced dissociation.

33. A method according to claim 32 wherein said voltage applied to said first element comprises an oscillating voltage component.

34. A method according to claim 32 wherein said charged particles are subjected to oscillation by an oscillating electric potential field having sub-fields of alternating polarity.

35. A method according to claim 32 wherein said second element comprises at least two segments.

36. A method according to claim 35 wherein different voltages are applied to said segments.

37. An apparatus for manipulating charged particles, when present, said apparatus comprising:

(a) a tubular first element, and (b) a tubular second element, said second element being coaxially disposed within said first element, said second element having from two to eight openings through a wall thereof wherein said openings are elongated in a direction that is substantially parallel to the longitudinal axis of said second element, wherein said openings are distributed around a circumference of said element and wherein the length of each of said openings is at least about 20% of the length of said second element and wherein the dimensions of said openings are approximately equal and wherein the ends of said first element and said second element are not coplanar, and wherein said openings of said second element allow an electric field resulting from the application of electrical voltages to said first element and said second element to enter an area within said second element and generate within said second element an oscillating electric potential field having predetermined characteristics that manipulates charged particles, when present.

38. An apparatus according to claim 37 wherein said second element comprises at least two individual segments and each of said segments has from two to eight openings in said wall thereof wherein the length of said openings is at least about 20% of the length of said segments.

39. An apparatus according to claim 37 wherein said first element and said second element are metal cylinders.

40. An apparatus for manipulating charged particles, when present, said apparatus comprising:

(a) a hollow first element, and (b) a hollow second element, said second element being disposed within said first element, said second element having at least two openings through a wall thereof wherein said openings are elongated in a direction that is substantially parallel to the longitudinal axis of said second element, wherein said openings are distributed around a circumference of said element, wherein the length of said openings are at least about 20% of the length of said second element, and wherein said openings of said second element allow an electric field resulting from the application of electrical voltages to said first element and said second element to enter an area within said second element and generate within said second element an oscillating electric potential field having predetermined characteristics that manipulates charged particles, when present, wherein said apparatus is disposed between at least two vacuum chambers.

41. A mass spectroscopy apparatus comprising:

(a) an ion source, (b) an apparatus adjacent said ion source, said apparatus comprising (i) a tubular first element and (ii) a tubular second element, said second element being coaxially disposed within said first element, said second element having two to eight openings through a wall thereof wherein said openings are elongated in a direction that is substantially parallel to the longitudinal axis of said second element, wherein said openings are distributed around a circumference of said element and wherein the length of each of said openings is at least about 20% of the length of said second element, and wherein said openings of said second element allow an electric field resulting from the application of an electrical voltage applied to said first element to enter an area within said second element and generate within said second element an oscillating electric potential field having predetermined characteristics, (c) an electrical source for independently applying voltages to said first element and said second element, (d) a mass analyzer adjacent said apparatus of (b), and (e) at least two vacuum chambers wherein said apparatus of (b) is disposed therebetween.

* * * * *